UNITED STATES PATENT OFFICE.

HANS BUCHTALA, OF GRATZ, AUSTRIA, ASSIGNOR TO DR. BAYER ES TARSA, A FIRM COMPRISING DEZSO BAYER AND RUDOLPH BRAUN DE BELATIN, OF BUDAPEST, HUNGARY.

PROCESS OF PRODUCING MERCURY PREPARATIONS FOR THERAPEUTIC PURPOSES.

1,271,846. Specification of Letters Patent. Patented July 9, 1918.

No Drawing. Original application filed June 5, 1913, Serial No. 771,796. Divided and this application filed August 18, 1915. Serial No. 46,203.

*To all whom it may concern:*

Be it known that I, HANS BUCHTALA, a subject of the Emperor of Austria, residing in Gratz, Austria, have invented a new and useful Process of Producing Mercury Preparations for Therapeutic Purposes, of which the following is a specification.

The subject matter of the present application has been divided out of my U. S. application, Serial No. 771,796, filed June 5, 1913.

The present invention provides a process for producing a therapeutic mercurial preparation, which preparation is characterized by the uniformity and stability of its alkaline solutions and freedom from irritation and smarting in application.

By heating a solution of tyrosin ($\beta$-parahydroxyphenyl-$\alpha$-aminopropionic acid) in water with freshly precipitated mercuric oxid until the color of the mercuric oxid disappears, there arises a milky liquid out of which there separates a white precipitate.

*Example.*

5.43 grams of tyrosin are dissolved in 4 liters of hot water; to the hot solution 6.48 grams of mercuric oxid in the freshly precipitated condition are added, and the solution heated until the precipitate has assumed a pure white color. The reaction is generally completed in from two to two and a half hours.

After cooling, the centrifugal drying machine is employed, the precipitate is washed with water and dried in the drying tank at about fifty degrees. Result: 8.5 grams. The empirical composition attained by analysis is $C_9H_9O_3NHg$.

This compound is almost insoluble in water and on heating melts with decomposition; it is soluble in soda and potash lye and there is attained in the solution of 0.1 gram of material suspended in 9 c. c. of water, with the addition of 1.05 c. c. of 1% soda lye, or with the addition of 2 c. c. of 1% potash lye, a clear stable solution.

The properties of the product are more fully set forth in my application above referred to. Solutions of the mercurial compound are described in my U. S. application Serial No. 840,454, filed May 23, 1914, which application is also a division of my application Serial No. 771,796.

What is claimed is:—

1. The method of producing a therapeutic mercurial preparation, comprising producing a reaction between tyrosin and mercuric oxid.

2. The method of producing a therapeutic mercurial preparation, which consists in heating tyrosin in an aqueous solution with mercuric oxid.

3. The method of producing a therapeutic mercurial preparation, comprising producing a reaction between tyrosin and mercuric oxid, and then dissolving the product obtained thereby in an alkaline solution.

4. The method of producing a therapeutic mercurial preparation, which consists in heating tyrosin in an aqueous solution with mercuric oxid, and then dissolving the product obtained thereby in an alkaline solution.

In witness whereof, I have hereunto signed my name in the presence of two subscribing witnesses.

DR. HANS BUCHTALA.

Witnesses:
AUGUST FUGGER,
JOHANN FLEISCHMANN.